(12) United States Patent
Neumark et al.

(10) Patent No.: US 10,094,155 B2
(45) Date of Patent: Oct. 9, 2018

(54) CORROSION RESISTANT BUSHING

(71) Applicant: Saint-Gobain Performance Plastics Pampus GMBH, Willich (DE)

(72) Inventors: Ralf Neumark, Duesseldorf (DE); Hans-Juergen Jaeger, Huerth (DE); Ansgar M. Haeger, Niederkruechten (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 14/843,915

(22) Filed: Sep. 2, 2015

(65) Prior Publication Data

US 2016/0069112 A1    Mar. 10, 2016

Related U.S. Application Data

(60) Provisional application No. 62/044,816, filed on Sep. 2, 2014.

(51) Int. Cl.
*E05D 3/02* (2006.01)
*E05D 11/04* (2006.01)
(Continued)

(52) U.S. Cl.
CPC .............. *E05D 3/022* (2013.01); *B32B 15/08* (2013.01); *E05D 11/04* (2013.01); *F16C 33/201* (2013.01);
(Continued)

(58) Field of Classification Search
CPC ......... E05D 3/022; E05D 11/04; B32B 15/08; B32B 2307/752; B32B 2311/24;
(Continued)

(56) References Cited

U.S. PATENT DOCUMENTS 2,865,692 A * 12/1958 Gossmann .............. F16C 33/20
384/298
4,072,368 A *  2/1978 Ehrentraut .............. F16C 33/12
384/295
(Continued)

FOREIGN PATENT DOCUMENTS

DE    112013001639 T5    12/2014
JP    H07238936 A         9/1995
(Continued)

OTHER PUBLICATIONS

International Search Report for PCT/IB2015/001925 dated Feb. 12, 2016, 1 page.

*Primary Examiner* — William L Miller
(74) *Attorney, Agent, or Firm* — Abel Law Group, LLP; Chi Suk Kim

(57) ABSTRACT

A method of forming a corrosion resistant bushing includes bonding a sliding layer to a first surface of a load bearing substrate to form a laminate sheet and cutting a blank from the laminate sheet. The laminate sheet includes an exposed surface corresponding to a second surface of the load bearing substrate. The blank includes cut edges having a load bearing substrate portion. The method further includes forming a semi-finished bushing from the blank.

18 Claims, 4 Drawing Sheets

FIG. 2B

(51) Int. Cl.
*F16C 33/20* (2006.01)
*B32B 15/08* (2006.01)
*F16C 11/04* (2006.01)
*F16C 17/10* (2006.01)

(52) U.S. Cl.
CPC .......... *F16C 33/203* (2013.01); *F16C 33/205* (2013.01); *B32B 2307/752* (2013.01); *B32B 2311/24* (2013.01); *B32B 2327/18* (2013.01); *B32B 2475/00* (2013.01); *F16C 11/04* (2013.01); *F16C 17/10* (2013.01); *F16C 33/208* (2013.01); *F16C 2202/06* (2013.01); *F16C 2208/10* (2013.01); *F16C 2208/32* (2013.01); *F16C 2223/40* (2013.01); *F16C 2223/42* (2013.01); *F16C 2240/54* (2013.01); *F16C 2240/60* (2013.01); *Y10T 16/05* (2015.01)

(58) Field of Classification Search
CPC . B32B 2327/18; B32B 2475/00; F16C 33/20; F16C 33/201; F16C 33/1203; F16C 33/1208; F16C 33/203; F16C 33/208; F16C 33/205; F16C 11/04; F16C 17/10; F16C 2202/06; F16C 2208/10; F16C 2208/32; F16C 2223/40; F16C 2223/42; F16C 2240/54; F16C 2240/60; Y10T 16/05
USPC .................. 16/2.1; 384/297, 300, 276, 625; 428/209, 655, 500
See application file for complete search history.

(56) References Cited

U.S. PATENT DOCUMENTS

| | | | | |
|---|---|---|---|---|
| 4,889,772 A | * | 12/1989 | Bergmann | C23C 14/541 384/910 |
| 4,916,026 A | * | 4/1990 | Bergmann | C23C 14/165 384/42 |
| 5,056,937 A | * | 10/1991 | Tanaka | F16C 33/122 384/278 |
| 5,803,614 A | * | 9/1998 | Tsuji | B32B 15/01 384/276 |
| 6,178,639 B1 | * | 1/2001 | Lytwynec | B32B 15/012 29/898.047 |
| 6,258,413 B1 | | 7/2001 | Woelki et al. | |
| 6,596,671 B2 | | 7/2003 | Whitney, Jr. et al. | |
| 6,740,428 B2 | * | 5/2004 | Norito | C23C 14/06 384/907 |
| 7,118,808 B2 | * | 10/2006 | Wolki | F16C 33/28 428/613 |
| 8,033,733 B2 | * | 10/2011 | Lang | F16C 17/02 384/276 |
| 8,408,800 B2 | | 4/2013 | Hagan | |
| 8,491,194 B2 | | 7/2013 | Hagan et al. | |
| 8,840,308 B2 | * | 9/2014 | Ortiz | B32B 1/08 384/276 |
| 8,944,690 B2 | * | 2/2015 | Natu | F16C 11/04 16/2.1 |
| 9,168,726 B2 | * | 10/2015 | Ponnouradjou | B32B 7/12 |
| 2003/0134141 A1 | | 7/2003 | Okado et al. | |
| 2010/0080497 A1 | | 4/2010 | Jaeger et al. | |
| 2011/0049834 A1 | | 3/2011 | Natu | |
| 2011/0124535 A1 | | 5/2011 | Wada et al. | |
| 2012/0240350 A1 | * | 9/2012 | Natu | E05D 11/0081 16/2.2 |
| 2014/0044385 A1 | | 2/2014 | Andel Kovski | |
| 2015/0016766 A1 | | 1/2015 | Asakura et al. | |

FOREIGN PATENT DOCUMENTS

| | | |
|---|---|---|
| JP | 2006283905 A | 10/2006 |
| WO | 2004104268 A1 | 12/2004 |
| WO | 2009139440 A1 | 11/2009 |
| WO | 2014009550 A1 | 1/2014 |
| WO | 2014090764 A1 | 6/2014 |

* cited by examiner

CORROSION RESISTANT BUSHING

CROSS-REFERENCE TO RELATED APPLICATION(S)

This application claims priority under 35 U.S.C. § 119(e) to U.S. Patent Application No. 62/044,816 entitled "Corrosion Resistant Bushing," by Ralf Neumark, Hans-Juergen Jaeger and Ansgar M. Haeger, filed Sep. 2, 2014, which is assigned to the current assignee hereof and incorporated herein by reference in its entirety.

FIELD OF THE DISCLOSURE

This disclosure, in general, relates corrosion resistant bushings with a high load capability.

BACKGROUND

Sliding bearing composite materials consisting of a load bearing substrate and a sliding layer overlay are generally known. The load bearing substrate and the sliding layer are usually connected by laminating using a suitable adhesive. The sliding bearing composite materials can be used to form maintenance free bushing used, for example, by the automotive industry. These maintenance free bushings can be used for door, hood, and engine compartment hinges, seats, steering columns, flywheels, balancer shaft bearings, etc. Additionally, maintenance free bushings formed from the sliding bearing composite materials can also be used in non-automotive applications. In some applications, the sliding bearings are exposed to environmental conditions that lead to corrosion, especially when the load bearing substrate is made of iron alloys, such as steel. There is an ongoing need for improved maintenance free bushings that have a longer maintenance free lifetime and improved delamination resistance or corrosion resistance a high load capability.

SUMMARY

In a first aspect, a sliding article comprises a load bearing substrate, an aluminum-containing layer, and a sliding layer. The load bearing substrate has a first major surface, a second major surface, and an edge. The load bearing substrate further comprises a thickness $t_1$. The aluminum-containing layer can overlie and can be in direct contact with the first major surface. The aluminum containing layer has a thickness $t_2$. In at least one embodiment, $t_2$ is at least 10 μm. The sliding layer can overlie the first major surface or the second major surface. In at least one embodiment the ratio of $t_2/t_1$ is at least 1/10, or $t_1 \leq 10\, t_2$.

In a second aspect, a hinge assembly can include a first hinge portion and a second hinge portion, a pin joining the first hinge portion with the second hinge portion, and a bushing. The bushing can include a load bearing substrate, an aluminum-containing layer, and a sliding layer. The load bearing substrate can have a first major surface, a second major surface opposite the first major surface, and an edge. The load bearing substrate includes a thickness $t_1$. The aluminum containing layer overlies and can be in direct contact with the first major surface. The aluminum-containing layer can have a thickness $t_2$. In one embodiment, $t_2$ is at least 10 μm. The sliding layer can overlie the first major surface or the second major surface. A ratio of $t_2/t_1$ can be at least 1/10.

In a third aspect, a method of preparing a bushing can include providing a load bearing substrate and an aluminum containing layer. The load bearing substrate has a first major surface and a second major surface. The aluminum containing can be cladded onto the first major surface. In another embodiment, an aluminum containing coating provided by e.g. spray coating, metal spraying, mechanical coating, galvanic, hot-dipping, or any combination thereof. The method can further include applying a sliding layer over first major surface or over the second major surface to form a laminate. The method can further include cutting a blank from the laminate. The method can further include forming a bushing from the blank.

In a fourth aspect, a method of preparing a corrosion resistant iron-containing article can include providing a substrate. The substrate includes a first major surface and a second major surface. The substrate includes an iron containing layer. The iron containing layer can form the first major surface. The substrate can further include an aluminum containing layer, the aluminum containing layer overlying the first major surface. The method can further include cutting the substrate from the aluminum containing layer across the first major surface to the second major surface to form a cross-section. The method can further include forming an aluminous layer over the cross-section.

In a fifth aspect, a bushing includes a multilayered metallic substrate. The multi-layered substrate includes a steel layer. The steel layer has a first major surface and a second major surface. The bushing can further include a first aluminum containing layer adjacent to and in direct contact with the first major surface. The bushing can further include a second aluminum containing layer adjacent to and in direct contact with the second major surface. The bushing can further include an adhesive layer overlying the multilayered metallic substrate. The bushing can further include a fluoropolymer sliding layer overlying and in direct contact with the adhesive layer.

In a sixth aspect, a bushing includes a load bearing substrate. The load bearing substrate has a first major surface, a second major surface, and an edge. In one embodiment, the load bearing substrate has a thickness between 200 microns and 3000 microns. The bushing further includes an aluminum containing layer overlying and in direct contact with the first major surface. The aluminum containing layer can have a thickness between 20 microns and 300 microns. The bushing further includes a sliding layer overlying the first or the second major surface.

In a seventh aspect, a bushing includes a load bearing substrate. The load bearing substrate has a first major surface, a second major surface, and an edge. In one embodiment, the load bearing substrate has a thickness between 200 microns and 3000 microns. The bushing further includes a corrosion prevention layer overlying and in direct contact with the first major surface. The corrosion prevention layer can have a thickness between 20 microns and 300 microns. In one embodiment, the corrosion prevention layer can include a metal selected from magnesium, aluminum, titanium, scandium, zinc, or any combination thereof. The bushing further includes a sliding layer overlying the first or the second major surface.

In an eight aspect, a sliding article comprises a load bearing substrate, a coating, and a sliding layer. The load bearing substrate has a first major surface, a second major surface, and an edge. The load bearing substrate further comprises a thickness $t_1$. The coating can overlie and can be in direct contact with the first major surface. The coating includes an elemental metal that has a Pauling electronegativity of less than 1.83. The coating has a thickness $t_2$. In at least one embodiment, $t_2$ is at least 10 μm. The sliding layer can overlie the first major surface or the second major surface. In at least one embodiment the ratio of $t_2/t_1$ is at least 1/10, or $t_1 \leq 10\, t_2$.

In a ninth aspect, a hinge assembly can include a first hinge portion and a second hinge portion, a pin joining the first hinge portion with the second hinge portion, and a bushing. The bushing can include a load bearing substrate, a coating, and a sliding layer. The load bearing substrate can have a first major surface, a second major surface opposite the first major surface, and an edge. The load bearing substrate includes a thickness $t_1$. The coating can overlie and can be in direct contact with the first major surface. The coating includes an elemental metal that has a Pauling electronegativity of less than 1.83. The coating has a thickness $t_2$. In at least one embodiment, $t_2$ is at least 10 μm. The sliding layer can overlie the first major surface or the second major surface. A ratio of $t_2/t_1$ can be at least 1/10.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1B:
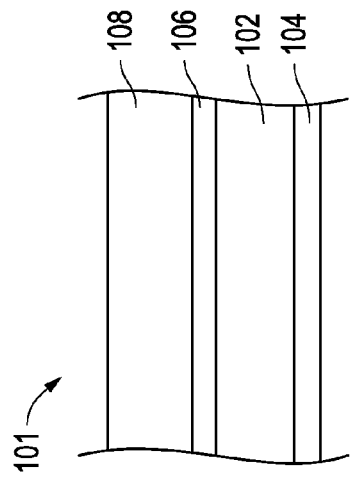
FIGS. 1A through 1D are illustrations of the layer structure of exemplary corrosion resistant bushings.
Figure 1D:
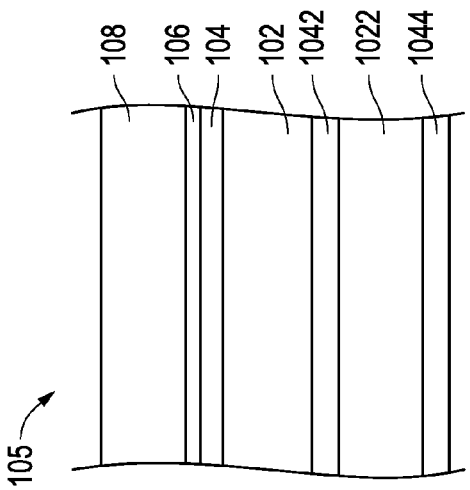
Figure 1A:
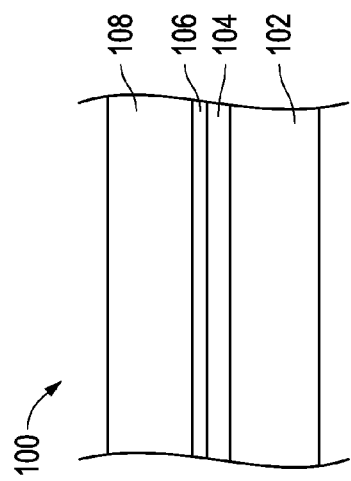

FIG. 1A shows a cross section illustrating the various layers of the corrosion resistant bushing, generally designated 100. Bushing 100 can include a load bearing substrate 102. The load bearing substrate 102 is a metallic support layer that is able to cope with high strain or high pressure. The load bearing substrate 102 can be susceptible to corrosion. The metallic support layer 102 can include a metal or metal alloy such as steel including carbon steel, spring steel, and the like, iron, or any combination thereof. In a particular embodiment, the load bearing substrate 102 can be a metal (including metal alloys), such as ferrous alloys. In one further embodiment, the load bearing substrate 102 is selected from an iron-containing substrate, a tin-containing substrate, a copper-containing substrate, a titanium-containing substrate, or any combination thereof. The load bearing substrate 102 is coated with a corrosion protection layer 104. The corrosion protection layer 104 can include aluminum or an aluminum alloy.

The load bearing substrate 102 has a thickness $t_1$. In an embodiment, $t_1$ is at least 50 microns, at least 80 microns, at least 100 microns, at least 150 microns, at least 200 microns, or at least 300 microns. In another embodiment, $t_1$ is not greater than 800 microns, not greater than 700 microns, not greater than 650 microns, not greater than 600 microns, not greater than 550 microns, not greater than 500 microns, not greater than 480 microns, not greater than 460 microns, not greater than 440 microns, or not greater than 420 microns. In yet one further embodiment, $t_1$ ranges from 50 microns to 800 microns, such as from 100 microns to 600 microns, from 200 microns to 500 microns, or from 300 microns to 450 microns. In one particular embodiment, $t_1$ ranges from 380 microns to 420 microns.

The load bearing substrate is highly resilient to mechanical forces. In one embodiment, the load bearing substrate has a tensile strength of at least 120 MPa, at least 140 MPa, 160 MPa, at least 180 MPa, at least 200 MPa, at least 220 MPa, or at least 240 MPa. In yet one further embodiment, the load bearing substrate has a tensile strength of not greater than 600 MPa, not greater than 500 MPa, not greater than 450 MPa, not greater than 400 MPa, not greater than 350 MPa, not greater than 300 MPa, or not greater than 250 MPa. In another embodiment, the load bearing substrate has a yield strength in a range from 100 MPa to 2000 MPa, in a range from 150 MPa to 1500 MPa, in a range from 200 MPa to 1000 MPa, or in a range from 200 MPa to 600 MPa.

Load bearing substrates as described above often have a susceptibility to corrosion. Corrosion susceptibility can be tested according to neutral salt spray test ISO 9227:2006. In the absence of any corrosion protection, load bearing substrates that include iron, such as steel show red corrosion after 5 hrs of salt spraying.

The aluminum containing layer 104 has a thickness $t_2$. In one embodiment, $t_2$ can be at least 20 microns, at least 25 microns, at least 30 microns, at least 35 microns, at least 40 microns, at least 45 microns, or at least 50 microns. In another embodiment, $t_2$ is not greater than 200 microns, not greater than 180 microns, not greater than 160 microns, not greater than 140 microns, not greater than 120 microns, not greater than 100 microns, not greater than 90 microns, not greater than 80 microns, not greater than 70 microns, or not greater than 60 microns. In yet one further embodiment, $t_2$ is in a range from 20 microns to 200 microns, in a range from 25 microns to 180 microns, in a range from 30 microns to 120 microns, or in a range from 40 microns to 80 microns. In one particular embodiment, $t_2$ is between 45 microns and 50 microns.

In one embodiment, the aluminum containing layer has a tensile strength of at least 50 MPa, at least 55 MPa, 60 MPa, at least 65 MPa, at least 70 MPa, at least 75 MPa, or at least 80 MPa. In another embodiment, the aluminum containing layer has a tensile strength of not greater than 200 MPa, not greater than 190 MPa, not greater than 180 MPa, not greater than 160 MPa, not greater than 150 MPa, not greater than 140 MPa, not greater than 130 MPa, not greater than 120 MPa, not greater than 110 MPa, or not greater than 100 MPa.

Addressing the aluminum content of the aluminum containing layer, in one embodiment, the aluminum containing layer has an aluminum content at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %. In another embodiment, the aluminum content is not greater than 99.99999 wt %, not greater than 99.99 wt %, not greater than 99.95 wt %, not greater than 99.9 wt %, not greater than 99.85 wt %, not greater than 99.8 wt %, not greater than 99.5 wt %, not greater than 99 wt %, not greater than 98 wt %, not greater than 95 wt %, not greater than 93 wt %, not greater than 85 wt %, not greater than 80 wt %, not greater than 70 wt %, or not greater than 60 wt %. In one embodiment, the aluminum containing layer has an aluminum content in a range from 25 wt % to 99.99999 wt %, in a range from 50 wt % to 99.99 wt %, in a range from 90 wt % to 99.99 wt %, or in a range from 95 wt % to 99.9 wt %.

As discussed above, the aluminum containing layer can have an aluminum content that is not the majority component. Thus, the aluminum content can be not greater than 50 wt %, not greater than 45 wt %, not greater than 40 wt %, not greater than 35 wt %, not greater than 30 wt %, or not greater than 25 wt %. For example, in one embodiment, the aluminum containing layer can contain another metal selected from the group of lithium, beryllium, sodium, magnesium, scandium, titanium, vanadium, chromium, manganese, iron, cobalt, nickel, copper, silicon, and zinc. In one particular embodiment, the aluminum containing layer includes an aluminum magnesium alloy, such as $Al_xMg_y$, wherein x is selected from 0.1, 0.2, 0.25, 0.33, 0.5, and x+y=1.

In yet another embodiment the aluminum containing layer can be replaced by a coating, The coating can include an elemental metal that has a Pauling electronegativity of less than the Pauling electronegativity of iron. In one embodiment, the elemental metal has a Pauling electronegativity of less than 1.83. In another embodiment, the elemental metal can be selected from beryllium, magnesium, lithium, sodium, scandium, titanium, vanadium, chromium, manganese, zinc, aluminum, or any combination or alloys thereof. In another embodiment, the elemental metal is selected from magnesium, aluminum, zinc, an alloy comprising magnesium, aluminum, or zinc, or any combination thereof.

In yet one further embodiment, the aluminum containing layer has a structured surface. For example, the aluminum containing layer has a structured surface comprising wall-like depressions, wall-like elevations, or any combination thereof. The wall-like depressions or wall-like elevations can have a height in a range of 0.1 microns to 30 microns, in a range of 1 micron to 20 microns, or 2 microns to 15 microns. In one embodiment, the structured surface can include regular polygon patterns, such as triangular patterns, rectangular patterns, square patterns, pentagon patterns, hexagonal patterns, higher polygon patterns, and combination thereof. The patterns can be depressions into the aluminum layer, elevations from the aluminum layer, or combination thereof. In one particular embodiment, the aluminum containing layer has a honeycomb structured surface. In one further embodiment, the surface structures can have irregular patterns. In yet another embodiment, the aluminum containing layer has a surface roughness of at least 1 micron, at least 2 microns, at least 3 microns, at least 4 microns, or at least 5 microns. In another embodiment, the aluminum containing layer has a surface roughness of not greater than 20 microns, not greater than 15 microns, not greater than 12 microns, not greater than 10 microns, or not greater than 8 microns.

In order to obtain maximum corrosion resistance a minimum ratio of $t_2/t_1$ is necessary. In one embodiment, the ration of $t_2/t_1$ is at least 1/10. In order to maintain the tensile strength of the load bearing substrate 102, the ratio $t_1/t_2$ needs to remain below a maximum. In one embodiment, the ratio of $t_2/t_1$ is not greater than 1/3, not greater than 1/4, not greater than 1/5, not greater than 1/6, not greater than 1/7, not greater than 1/8, or not greater than 1/9. In yet one further embodiment, the ratio of $t_2/t_1$ is in a range from 1/10 to 1/4, in a range from 1/10 to 1/5, or in a range from 1/9 to 1/7.

In one further embodiment, layer 104 is a corrosion prevention layer. The corrosion prevention layer can include a metal selected from magnesium, aluminum, titanium, scandium, zinc, or any combination thereof. In one embodiment, the corrosion prevention layer consists essentially of the metal. In another embodiment, the corrosion prevention layer is substantially free of iron. In one further embodiment, the corrosion prevention layer consists essentially of magnesium. The corrosion prevention layer can consists essentially of a metal having an electronegativity of less than 1.70.

The corrosion prevention layer can have a thickness between 20 and 300 microns. In another embodiment, the corrosion prevention layer can have a thickness ratio to the load bearing substrate as outlined and described herein.

A sliding layer 108 can be applied to the aluminum containing layer 104 with an adhesive layer 106. The sliding layer 108 can include a polymer, such as a fluoropolymer. Examples of polymers that can be used in sliding layer 108 include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer (PFA), polyacetal (POM), polybutylene terephthalate (PBT), polyimide (PI), polyamidimide (PAI), polyetherimide, polyetheretherketone (PEEK), polyethylene, such as ultra-high molecular weight polyethylene (UHMWPE), polysulfone, polyamide, polyphenylene oxide, polyphenylene sulfide (PPS), polyurethane, polyester, or any combination thereof.

Additionally, the sliding layer 108 can include fillers, such as a friction reducing filler. Examples of fillers that can be used in the sliding layer 108 include glass, glass fibers, carbon, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), polyimide (PI), PPS, polyphenylene sulfone (PPSO2), liquid crystal polymers (LCP), aromatic polyesters (Econol), and mineral particles such as wollastonite, CaF2, and bariumsulfate, or any combination thereof. Fillers can be in the form of beads, fibers, powder, mesh, fleece, or any combination thereof.

Addressing the thickness of the sliding layer, in one embodiment, the sliding layer has a thickness of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. In another embodiment, the sliding layer has a thickness of not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm. In one embodiment, the sliding layer has a thickness in a range between 0.05 mm and 2 mm, in a range between 0.2 mm and 1 mm, or in a range between 0.3 mm and 0.7 mm.

In addressing the tensile strength of the load bearing substrate and the aluminum containing layer, in one embodiment, the combined tensile strength of the load bearing substrate and the aluminum containing is at least 70% of the tensile strength of the load bearing substrate, at least 75% of the tensile strength of the load bearing substrate, at least 80% of the tensile strength of the load bearing substrate, at least 80% of the tensile strength of the load bearing substrate, at least 85% of the tensile strength of the load bearing substrate, at least 90% of the tensile strength of the load bearing substrate, at least 95% of the tensile strength of the load bearing substrate, at least 98% of the tensile strength of the load bearing substrate, at least 99% of the tensile strength of the load bearing substrate, at least 99.9% of the tensile strength of the load bearing substrate, or at least 99.99% of the tensile strength of the load bearing substrate.

In an embodiment, the sliding layer 108 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the sliding layer may not include a mesh or grid. In another alternate embodiment, the woven mesh, a fleece or expanded metal grid may be embedded between adhesive layers 106 and sliding layer 108.

In one embodiment, the expanded metal layer has a mesh size of at least 10 mesh/inch, such as at least 11 mesh/inch, at least 13 mesh/inch, at least 15 mesh/inch, at least 17 mesh/inch, at least 19 mesh/inch, or at least 21 mesh/inch. In another embodiment, the expanded metal layer has a thickness of at least 0.1 mm, such as at least 0.2 mm, at least 0.3 mm, at least 0.4 mm, at least 0.5 mm, or at least 0.6 mm. In yet another embodiment, the expanded metal layer has a thickness of not greater than 1 mm, not greater than 0.9 mm, not greater than 0.8 mm, not greater than 0.7 mm, not greater than 0.6 mm, not greater than 0.55 mm, or not greater than 0.5 mm.

Returning to FIG. 1, adhesive layer 106 can be a hot melt adhesive. Examples of adhesive that can be used in adhesive layer 106 include fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. Additionally, the adhesive layer 106 can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive layer 106 can include a copolymer. In an embodiment, the hot melt adhesive can have a melting temperature of not greater than about 250° C., such as not greater than about 220° C. In another embodiment, the adhesive layer 112 may break down above about 200° C., such as above about 220° C. In further embodiments, the melting temperature of the hot melt adhesive can be higher than 250° C., even higher than 300° C.

Referring to FIG. 1B, in another embodiment, the aluminum containing layer 104 is located adjacent to the load bearing substrate and opposite to the sliding layer 108. In those embodiments, the aluminum containing layer serves as a corrosion resistant layer or a passivation layer. In an assembly, the aluminum containing layer 104 as shown in FIG. 1B contacts another metal part. Layer 104 acts as a sacrificial anode to protect the assembly from corrosion.

Figure 1C:
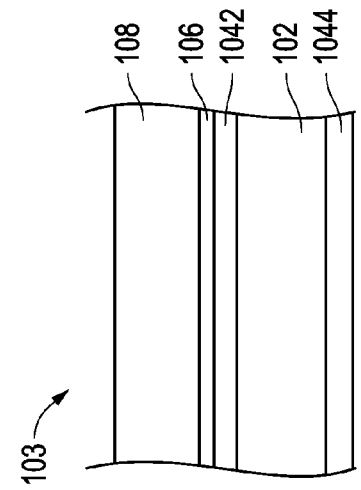

Referring to FIG. 1C, another embodiment includes the presence of two aluminum containing layers 1042 and 1044 adjacent to the load bearing substrate overlying opposite surfaces of the load bearing substrate 102. In this embodiment, layer 1042 can have a thickness $t_2$ and layer 1044 can have a thickness $t_3$. Layers 1042 and 1044 can be the same or differ in thickness, aluminum content, or surface structure.

With respect to FIG. 1C, a ratio of $(t_2+t_3)/t_1$ is at least 1/10. In another embodiment, the ratio of $(t_2+t_3)/t_1$ is not greater than 1/3, not greater than 2/7, not greater than 1/4, not greater than 2/9, or not greater than 1/5. In yet another embodiment, the ratio of $(t_2+t_3)/t_1$ is in a range from 1/10 to 1/3, in a range from 1/8 to 1/3, or in a range from 1/5 to 1/3.

Referring to FIG. 1D, in another embodiment, a load bearing substrate can include load bearing metal layers 102 and 1022, which can be the same or different in metal type, thickness, and composition. The load bearing substrate can include aluminum containing layers 104, 1042, and 1044, which, as well, can be the same or differ in thickness, aluminum content, and surface structure.

Figure 2A:
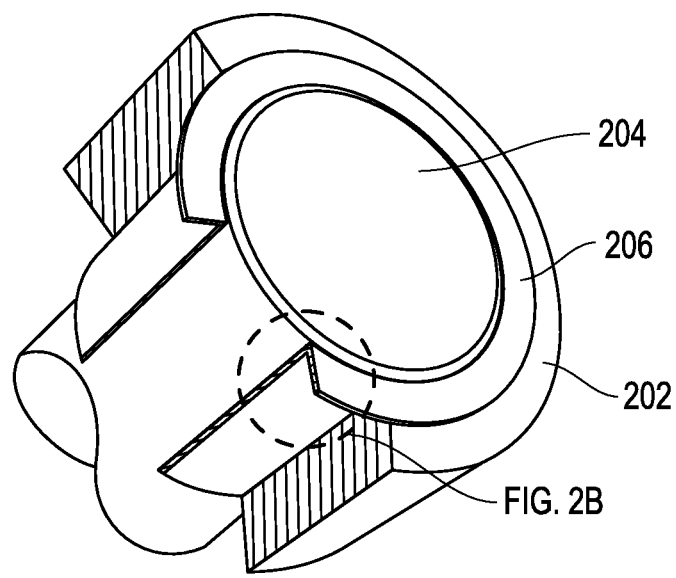
FIGS. 2A and 2B is an illustration and detail of an exemplary hinge.
Figure 2B:
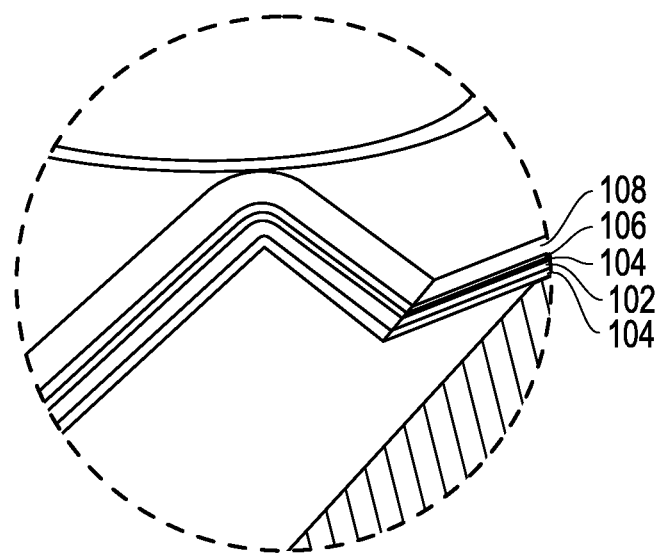

Laminates as shown in FIGS. 1A-1D find applications as bushings. One example of such bushing is illustrated in FIGS. 2A and 2B. Referring to FIG. 2A, an assembly includes an outer component 202 and an inner component 204 and a bushing 206 placed between components 202 and 204. The bushing can have flange extending radially outward and overlying the outer component. For illustrative purpose, FIG. 2A discloses only a section of the bushing 206. In embodiments, the bushing 206 can form a closed cylinder. In another embodiment, the bushing 206 can be a cylinder including a slit that extends from the first axial end to the second axial end.

FIG. 2B discloses a detail of bushing 206, showing all the layers discussed herein with two aluminum containing layers 104 sandwiching, load bearing substrate 102. In any embodiment, the bushing 206 has an edge that is exposed to the environment.

In one embodiment, the bushing can further include a functional layer adjacent to the load bearing substrate opposite to the sliding layer. In one embodiment, the functional layer can be an additional sliding layer, an elastomeric layer, or a combination thereof. For the functional layer being an elastomeric layer, the elastomeric layer can include nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

For the elastomeric layer, the firm bond between the support material and elastic layer can be produced by means of a vulcanization process at a temperature of about 150-250° C. Here, crosslinking can occur within the elastomer and with the surface of the support material which has been activated by the bonding agent. The bonding layer which is thus present between support material and elastic layer can comprise at least one reactive polymer, in particular a polymer based on silane, and/or pigments in a solvent, in particular in methyl isobutyl ketone, in xylene, in ethanol and water or in ethanol and methyl ethyl ketone.

Turning to the method of forming the bushing, the sliding layer can be glued to the load bearing substrate using a melt adhesive to form a laminate sheet. The laminate sheet can be cut into strips or blanks that can be formed into the bushing. Cutting the laminate sheet can create cut edges including an exposed portion of the load bearing substrate. The blanks can be formed into the bushing, such as by rolling and flanging the laminate to form a semi-finished bushing of a desired shape.

Figure 4:
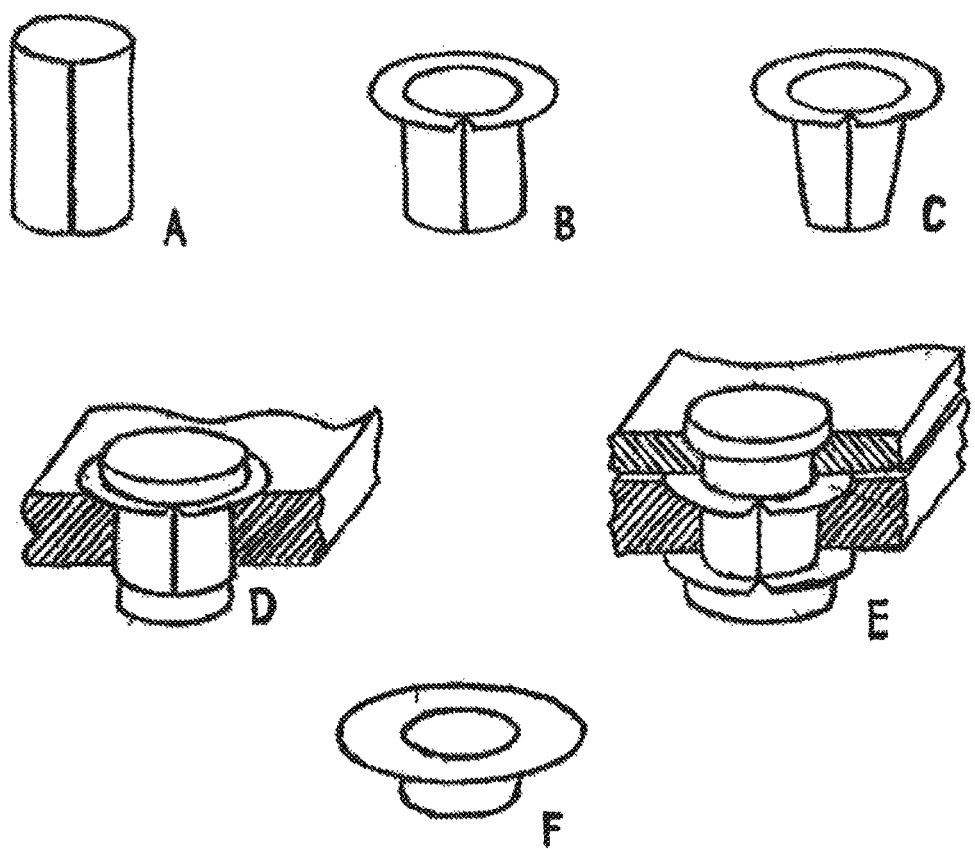
FIG. 4 illustrates various embodiments of bushing applications.

FIG. 4 depicts exemplary shapes or applications of the bushing. For example, the bushing can be a plain cylinder (4A), or include a flange (4B). In another embodiment, the bushing can be conical with a flange (4C) or without a flange (not shown). Embodiment 4D depicts a bushing with an inner element and an outer element. Embodiment 4E depicts a bushing with an inner element separated from a first outer element by the bushing but in contact with a second outer element adjacent to the first outer element; a bushing flange separates the first and second outer elements. For example, door hinges can fall into the scope of embodiment 4E. Embodiment 4F shows a flanged bushing lacking a slit, which is usually present after shaping.

In an embodiment, the bearing with such a corrosion resistant coating can have a significantly increased lifetime, and in particular, the bearing can have a Corrosion Resistance Rating according to neutral salt spray test ISO 9227: 2006. of at least 300 hours, at least 400 hours, at least 500 hours, at least 600 hours, at least 700 hours, at least 800 hours, at least 900 hours, at least 1000 hours, or at least 1100 hours. In another embodiment, the bushing has a corrosion resistance rating of not greater than 2000 hours, not greater than 1800 hours, not greater than 1600 hours, or not greater than 1500 hours.

Another feature of the bushings is the sizing capability of finished bushings. Sizing capacity is amount of plastic deformation the laminate of a bushing can undergo. Sizing capability is expressed in percentage decrease of wall thickness after a bushing has been deformed by an oversized pin. That is:

$$SC=(t_0-t_a)/t_0,$$

wherein SC is sizing capability, $t_0$ is the original thickness of the laminate and $t_a$ is the thickness after deformation by an oversized pin. Sizing capacity can be measured by stepwise deforming the bushing with an oversized pin. For example, a bushing can be deformed by 5% with a first pin and additional up to 5% with a second oversized pin, and up to 5% for each additional oversized pin.

In one embodiment, the bushing has sizing capability of at least 3%, at least 4%, at least 5%, at least 6%, at least 7%, at least 8%, at least 9%, at least 10%, at least 12%, at least 14%, at least 16%, or at least 18%.

The following item set lists exemplary embodiments of the present disclosure.

Embodiment 1

A sliding article comprising:
a load bearing substrate, having a first major surface, a second major surface, and an edge, the load bearing having a thickness t1,
an aluminum containing layer overlying and in direct contact with the first major surface, the aluminum containing layer having a thickness t2, wherein t2 is at least 10 microns,
a sliding layer overlying the first or the second major surface,
wherein a ratio of t2/t1 is at least 1/10.

Embodiment 2

A hinge assembly comprising:
a first hinge portion and a second hinge portion;
a pin joining the first hinge portion with the second hinge portion; and
a sliding article, the sliding article comprising:
a load bearing substrate, having a first major surface, a second major surface, and an edge, the load bearing having a thickness t1,
an aluminum containing layer overlying and in direct contact with the first major surface, the aluminum containing layer having a thickness t2, wherein t2 is at least 10 microns,
a sliding layer overlying the first or the second major surface,
wherein a ratio of t2/t1 is at least 1/10.

Embodiment 3

The sliding article or hinge assembly according to any one of embodiments 1 or 2 further comprising an additional aluminum containing layer overlying and in direct contact with the second major surface, the additional aluminum containing layer having a thickness t3.

Embodiment 4

The sliding article or hinge assembly according to any one of the preceding embodiments further comprising a functional layer overlying the load bearing substrate opposite the sliding layer.

Embodiment 5

The sliding article or hinge assembly according to embodiment 4, wherein the functional layer is a second sliding layer.

Embodiment 6

The sliding article or hinge assembly according to embodiment 4, wherein the functional layer is an elastomeric layer.

Embodiment 7

The sliding article or hinge assembly according to embodiment 6, wherein the elastomeric layer includes at least one of nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

Embodiment 8

The sliding article or hinge assembly according to embodiment 3, wherein a ratio of (t2+t3)/t1 is not greater than 1/3, not greater than 2/7, not greater than 1/4, not greater than 2/9, or not greater than 1/5.

Embodiment 9

The sliding article or hinge assembly according to embodiment 3, wherein a ratio of (t2+t3)/t1 is in a range from 1/10 to 1/3, in a range from 1/8 to 1/3, or in a range from 1/5 to 1/3.

Embodiment 10

The sliding article or hinge assembly according to any one of the preceding embodiments, wherein the ratio of t2/t1 is not greater than 1/3, not greater than 1/4, not greater than 1/5, not greater than 1/6, not greater than 1/7, not greater than 1/8, or not greater than 1/9.

Embodiment 11

The sliding article or hinge assembly according to any one of the preceding embodiments, wherein the ratio of t2/t1 is in a range from 1/10 to 1/3, in a range from 1/10 to 1/5, or in a range from 1/9 to 1/7.

Embodiment 12

The sliding article or hinge assembly according to any one of the preceding embodiments, wherein t2 is at least 25 microns, at least 30 microns, at least 35 microns, at least 40 microns, at least 45 microns, or at least 50 microns.

Embodiment 13

The sliding article or hinge assembly according to any one of the preceding embodiments, wherein t2 is not greater than 200 microns, not greater than 180 microns, not greater than 160 microns, not greater than 140 microns, not greater than 120 microns, not greater than 100 microns, not greater than 90 microns, not greater than 80 microns, not greater than 70 microns, or not greater than 60 microns.

Embodiment 14

The sliding article or hinge assembly according to any one of the preceding embodiments, wherein t2 is in a range from 20 microns to 200 microns, in a range from 25 microns to 180 microns, in a range from 30 microns to 120 microns, or in a range from 40 microns to 80 microns.

Embodiment 15

The sliding article or hinge assembly according to any one of the preceding embodiments, wherein t1 is at least 50 microns, at least 80 microns, at least 100 microns, at least 150 microns, at least 200 microns, at least 300 microns, at least 400 microns, at least 500 microns, at least 600 microns, at least 800 microns, at least 1000 microns, at least 1200 microns, at least 1400 microns, at least 1600 microns, at least 1800 microns, or at least 2000 microns.

Embodiment 16

The sliding article or hinge assembly according to any one of the preceding embodiments, wherein t1 is not greater than 2200 microns, not greater than 2000 microns, not greater than 1800 microns, not greater than 1600 microns, not greater than 1400 microns, not greater than 1200 microns, not grater than 1000 microns, not greater than 800 microns, not greater than 700 microns, not greater than 650 microns, not greater than 600 microns, not greater than 550 microns, not greater than 500 microns, not greater than 480 microns, not greater than 460 microns, not greater than 440 microns, or not greater than 420 microns.

Embodiment 17

The sliding article or hinge assembly according to any one of the preceding embodiments, wherein t1 is in a range from 50 microns to 2000 microns, in a range from 100 microns to 1000 microns, in a range from 200 microns to 500 microns, or in a range from 300 microns to 450 microns.

Embodiment 18

The sliding article or hinge assembly according to any one of the preceding embodiments, wherein the load bearing substrate contains a metal selected from an iron, tin, copper, zinc, titanium, scandium, vanadium, chromium, manganese, cobalt, nickel, or any combination thereof.

Embodiment 19

The sliding article or hinge assembly according to embodiment 18, wherein the iron-containing substrate comprises steel.

Embodiment 20

The sliding article or hinge assembly according to any one of the preceding embodiments, wherein the load bearing substrate is selected from a steel substrate, a brass substrate, a bronze substrate, or a combination thereof.

Embodiment 21

The sliding article or hinge assembly according to any one of the preceding embodiments, wherein the load bearing substrate comprises a steel substrate.

Embodiment 22

The sliding article or hinge assembly according to any one of the preceding embodiments, wherein the load bearing substrate consists essentially of a steel substrate.

Embodiment 23

The sliding article or hinge assembly according to any one of the preceding embodiments, wherein the load bearing substrate has a tensile strength of at least 120 MPa, at least 140 MPa, 160 MPa, at least 180 MPa, at least 200 MPa, at least 220 MPa, or at least 240 MPa.

Embodiment 24

The sliding article or hinge assembly according to any one of the preceding embodiments, wherein the load bearing substrate has a tensile strength of not greater than 600 MPa, not greater than 500 MPa, not greater than 450 MPa, not greater than 400 MPa, not greater than 350 MPa, not greater than 300 MPa, or not greater than 250 MPa.

Embodiment 25

The sliding article or hinge assembly according to any one of the preceding embodiments, wherein the load bearing substrate has a yield strength in a range from 100 MPa to 2000 MPa, in a range from 150 MPa to 1500 MPa, in a range from 200 MPa to 1000 MPa, or in a range from 200 MPa to 600 MPa.

Embodiment 26

The sliding article or hinge assembly according to any one of the preceding embodiments, wherein the aluminum containing layer has a tensile strength of at least 50 MPa, at least 55 MPa, 60 MPa, at least 65 MPa, at least 70 MPa, at least 75 MPa, or at least 80 MPa.

Embodiment 27

The sliding article or hinge assembly according to any one of the preceding embodiments, wherein the aluminum containing layer has a tensile strength of not greater than 200 MPa, not greater than 190 MPa, not greater than 180 MPa, not greater than 160 MPa, not greater than 150 MPa, not greater than 140 MPa, not greater than 130 MPa, not greater than 120 MPa, not greater than 110 MPa, or not greater than 100 MPa.

Embodiment 28

The sliding article or hinge assembly according to any one of the preceding embodiments, wherein the aluminum containing layer has an aluminum content of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 29

The sliding article or hinge assembly according to any one of the preceding embodiments, wherein the combined tensile strength of the load bearing substrate and the aluminum containing is at least 70% of the tensile strength of the load bearing substrate, at least 75% of the tensile strength of the load bearing substrate, at least 80% of the tensile strength of the load bearing substrate, at least 80% of the tensile strength of the load bearing substrate, or at least 85% of the tensile strength of the load bearing substrate.

Embodiment 30

The sliding article or hinge assembly according to any one of the preceding embodiments, wherein the aluminum containing layer has content of magnesium of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 31

The sliding article or hinge assembly according to any one of the preceding embodiments, wherein the aluminum containing layer has an aluminum content of not greater than 99.99999 wt %, not greater than 99.99 wt %, not greater than 99.95 wt %, not greater than 99.9 wt %, not greater than 99.85 wt %, not greater than 99.8 wt %, not greater than 99.5 wt %, not greater than 99 wt %, not greater than 98 wt %, not greater than 95 wt %, not greater than 93 wt %, or not greater than 85 wt %.

Embodiment 32

The sliding article or hinge assembly according to any one of the preceding embodiments, wherein the aluminum containing layer has an aluminum content in a range from 25 wt % to 99.99999 wt %, in a range from 50 wt % to 99.99 wt %, in a range from 90 wt % to 99.99 wt %, or in a range from 95 wt % to 99.9 wt %.

Embodiment 33

The sliding article or hinge assembly according to any one of the preceding embodiments, wherein the sliding layer comprises a fluoroploymer.

Embodiment 34

The sliding article or hinge assembly according to any one of the preceding embodiments, wherein the sliding layer comprises a polytetrafluoroethylene (PTFE), a modified PTFE (TFM), a fluorinated ethylene propylene (FEP), a polyvinylidene fluoride (PVDF), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), a perfluoro methyl alkoxy (MFA), polyoxymethylene (POM), polyethylene (PE), UHMWPE, or a mixture thereof.

Embodiment 35

The sliding article or hinge assembly according to any one of the preceding embodiments, wherein the sliding layer comprises a polytetrafluoroethylene compound layer.

Embodiment 36

The sliding article or hinge assembly according to any one of the preceding embodiments, wherein the sliding layer consists essentially of a polytetrafluoroethylene compound layer.

Embodiment 37

The sliding article or hinge assembly according to any one of the preceding embodiments, wherein the sliding layer has a thickness of at least about 0.01 mm, at least about 0.05 mm, at least about 0.1 mm, at least about 0.15 mm, at least about 0.2 mm, at least about 0.25 mm, at least about 0.3 mm, at least about 0.35 mm, at least about 0.4 mm, or at least about 0.45 mm.

Embodiment 38

The sliding article or hinge assembly according to any one of the preceding embodiments, wherein the sliding layer has a thickness of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm.

Embodiment 39

The sliding article or hinge assembly according to any one of the preceding embodiments, wherein the sliding layer has a thickness in a range between 0.05 mm and 5 mm, in a range between 0.2 mm and 2 mm, or in a range between 0.3 mm and 1 mm, Embodiment 40

The sliding article or hinge assembly according to any one of the preceding embodiments further comprising an adhesive layer adjacent to the sliding layer.

Embodiment 41

The sliding article or hinge assembly according to embodiment 40, wherein the adhesive layer comprises a thermoplastic.

Embodiment 42

The sliding article or hinge assembly according to embodiment 41, wherein the thermoplastic comprises tetrafluoroethylene-hexafluoropropylene (FEP), perfluoroalkoxyethylene (PFA), polyimide (PI), polyamidimide (PAI), polyphenylene sulfide (PPS), polyphenylene sulfone (PPSO2), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), polyetherketone (PEK), polyethylene (PE), UHMWPE, or any combination thereof.

Embodiment 43

The sliding article or hinge assembly according to embodiment 41, wherein the adhesive layer consists essentially of a thermoplastic selected from the group of tetrafluoroethylene-hexafluoropropylene (FEP), perfluoroalkoxyethylene (PFA), and a combination thereof.

Embodiment 44

The sliding article or hinge assembly according to embodiment 41, wherein the thermoplastic includes a modified thermoplastic comprising at least one of the group selected from C(=O)R, C—O—R, COOH, COOR, COH, ore any combination thereof, wherein R are cyclic or linear organic residues having from 1 to 20 carbon atoms.

Embodiment 45

The sliding article or hinge assembly according to any one of the preceding embodiments further comprising a discontinuous metal layer adjacent to the first major surface.

Embodiment 46

The sliding article or hinge assembly according to embodiment 45, wherein the discontinuous metal layer comprises aluminum, an aluminum alloy, a steel metal, a steel cladded or coated with an aluminum containing layer, or a combination thereof.

Embodiment 47

The sliding article or hinge assembly according to embodiment 45, wherein the discontinuous metal layer is selected from an expanded metal, a mesh, a fleece, a foam, or any combination thereof.

Embodiment 48

The sliding article or hinge assembly according to embodiment 45, wherein the discontinuous metal layer has a mesh size of at least 10 mesh/inch, such as at least 11 mesh/inch, at least 13 mesh/inch, at least 15 mesh/inch, at least 17 mesh/inch, at least 19 mesh/inch, or at least 21 mesh/inch.

Embodiment 49

The sliding article or hinge assembly according to embodiment 45, wherein the discontinuous metal layer has a thickness of at least 0.1 mm, such as at least 0.2 mm, at least 0.3 mm, at least 0.4 mm, at least 0.5 mm, or at least 0.6 mm.

Embodiment 50

The sliding article or hinge assembly according to embodiment 45, wherein the discontinuous metal layer has a thickness of not greater than 1 mm, not greater than 0.9 mm, not greater than 0.8 mm, not greater than 0.7 mm, not greater than 0.6 mm, not greater than 0.55 mm, or not greater than 0.5 mm.

Embodiment 51

The sliding article or hinge assembly according to any one of the preceding embodiments, wherein the aluminum containing layer has a structured surface.

Embodiment 52

The sliding article or hinge assembly according to any one of the preceding embodiments, wherein the aluminum containing layer has a structured surface comprising wall-like depressions, wall-like elevations, or any combination thereof.

Embodiment 53

The sliding article or hinge assembly according to embodiment 52, wherein the wall-like depressions or wall-like elevations have a height in a range of 0.1 microns to 200 microns, in a range of 1 micron to 50 microns, or 2 microns to 30 microns.

Embodiment 54

The sliding article or hinge assembly according to any one of the preceding embodiments, wherein the aluminum containing layer has a polygon structure.

Embodiment 55

The sliding article or hinge assembly according to embodiment 54, wherein the polygon structure is regular or non-regular.

Embodiment 56

The sliding article or hinge assembly according to embodiment 54, wherein the polygon structure is a honeycomb structure.

Embodiment 57

The sliding article or hinge assembly according to any one of the preceding embodiments, wherein the aluminum containing layer has a surface roughness of at least 1 micron, at least 2 microns, at least 3 microns, at least 4 microns, or at least 5 microns.

Embodiment 58

The sliding article or hinge assembly according to any one of the preceding embodiments, wherein the aluminum containing layer has a surface roughness of not greater than 20 microns, not greater than 15 microns, not greater than 12 microns, not greater than 10 microns, or not greater than 8 microns.

Embodiment 59

The sliding article or hinge assembly according to any one of the preceding embodiments further comprising an aluminous layer overlying the edges.

Embodiment 60

The sliding article or hinge assembly according to embodiment 51, wherein the aluminous layer comprises Al2O3.

Embodiment 61

The sliding article or hinge assembly according to embodiment 51, wherein the aluminous layer has a thickness of not greater than 5 microns, not greater than 4 microns, not greater than 3 microns, not greater than 2 microns, not greater than 1.5 microns, not greater than 1 micron, not greater than 0.9 microns, not greater than 0.8 microns, not greater than 0.7 microns, not greater than 0.6 microns, or not greater than 0.5 microns.

Embodiment 62

The sliding article or hinge assembly according to any one of the preceding embodiments, wherein the sliding article has a corrosion resistance rating according to neutral salt spray test ISO 9227:2006, of at least 300 hours, at least 400 hours, at least 500 hours, at least 600 hours, at least 700 hours, at least 800 hours, at least 900 hours, at least 1000 hours, or at least 1100 hours.

Embodiment 63

The sliding article or hinge assembly according to any one of the preceding embodiments, wherein the sliding article has a corrosion resistance rating of not greater than 1 million hours, not greater than 100 000 hours, or not greater than 10000 hours.

Embodiment 64

The sliding article or hinge assembly according to any one of the preceding embodiments, wherein the sliding article has sizing capability of at least 3%, at least 4%, at least 5%, at least 6%, at least 7%, at least 8%, at least 10%, at least 12%, at least 14%, at least 16%, or at least 18%.

Embodiment 65

A method of preparing a bushing, the method comprising:
providing a load bearing substrate comprising a first major surface and a second major surface;
coating an aluminum-containing layer over the first major surface;
applying a sliding layer over the first major surface or the second major surface to form a laminate;
cutting a blank from the laminate; and
forming a semi-finished bushing from the blank.

Embodiment 66

The method according to embodiment 65, wherein the coating includes cladding, spray coating, metal spraying, mechanical coating, galvanic coating, hot-dipping, or any combination thereof.

Embodiment 67

A method of preparing a corrosion resistant iron-containing article, the method comprising:
providing a substrate, the substrate comprising a first major surface and a second major surface, the substrate comprising an iron-containing layer, the iron-containing layer forming the first major surface, the substrate further comprising an aluminum layer, the aluminum layer overlying the first major surface;
cutting the substrate from the aluminum layer across the first major surface to the second major surface to form a cross-section; and
forming an aluminous layer over the cross-section.

Embodiment 68

A bushing comprising:
a multilayered metallic substrate, the multi-layered substrate comprising
a steel layer having a first major surface and a second major surface,
a first aluminum containing layer adjacent to and in direct contact with the first major surface, and
a second aluminum containing layer adjacent to and in direct contact with the second major surface;
an adhesive layer overlying the multilayered metallic substrate;
a fluoropolymer sliding layer overlying and in direct contact with the adhesive layer.

Embodiment 69

The bushing as described in embodiment 68, characterized in that the bushing has at least one axial collar.

Embodiment 70

The bushing as described in embodiment 68 or 69, characterized in that the bushing has an essentially cylindrical shape.

Embodiment 71

The bushing as described in embodiment 68 or 69, characterized in that the bushing has a conical shape.

Embodiment 72

A bushing comprising:
a load bearing substrate, having a first major surface, a second major surface, and an edge, the load bearing having a thickness between 200 microns and 3000 microns,
an aluminum containing layer overlying and in direct contact with the first major surface, the aluminum containing layer having a thickness between 20 microns and 300 microns, and
a sliding layer overlying the first or the second major surface.

Embodiment 73

The bushing according to embodiment 72 further comprising an additional aluminum containing layer overlying and in direct contact with the second major surface, the additional aluminum containing layer having a thickness between 20 microns and 300 microns.

Embodiment 74

The bushing according to any one of embodiments 72 or 73 further comprising a functional layer overlying the load bearing substrate opposite the sliding layer.

Embodiment 75

The bushing according to embodiment 74, wherein the functional layer is a second sliding layer.

Embodiment 76

The bushing according to embodiment 74, wherein the functional layer is an elastomeric layer.

Embodiment 77

The bushing according to embodiment 76, wherein the elastomeric layer includes at least one of nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

Embodiment 78

The bushing according to any one of embodiments 72 through 77, wherein the thickness of the aluminum containing layer is in a range from 20 microns to 250 microns, in a range from 25 microns to 200 microns, in a range from 30 microns to 150 microns, or in a range from 40 microns to 100 microns.

Embodiment 79

The bushing according to any one of embodiments 72 through 78, wherein the thickness of the load bearing substrate is in a range from 200 microns to 2500 microns, in a range from 250 microns to 2000 microns, in a range from 300 microns to 1500 microns, or in a range from 350 microns to 1000 microns.

Embodiment 80

The bushing according to any one of embodiments 72 through 79, wherein the load bearing substrate contains a metal selected from an iron, tin, copper, zinc, titanium, scandium, vanadium, chromium, manganese, cobalt, nickel, or any combination thereof.

Embodiment 81

The bushing according to embodiment 80, wherein the iron-containing substrate comprises steel.

Embodiment 82

The bushing according to any one of embodiments 72 through 81, wherein the load bearing substrate is selected from a steel substrate, a brass substrate, a bronze substrate, or a combination thereof.

Embodiment 83

The bushing according to any one of embodiments 72 through 82, wherein the load bearing substrate consists essentially of a steel substrate.

Embodiment 84

The bushing according to any one of embodiments 72 through 83, wherein the load bearing substrate has a tensile strength of at least 120 MPa, at least 140 MPa, 160 MPa, at least 180 MPa, at least 200 MPa, at least 220 MPa, or at least 240 MPa.

Embodiment 85

The bushing according to any one of embodiments 72 through 84, wherein the load bearing substrate has a tensile strength of not greater than 600 MPa, not greater than 500 MPa, not greater than 450 MPa, not greater than 400 MPa, not greater than 350 MPa, not greater than 300 MPa, or not greater than 250 MPa.

Embodiment 86

The bushing according to any one of embodiments 72 through 85, wherein the load bearing substrate has a yield strength in a range from 100 MPa to 2000 MPa, in a range from 150 MPa to 1500 MPa, in a range from 200 MPa to 1000 MPa, or in a range from 200 MPa to 600 MPa.

Embodiment 87

The bushing according to any one of embodiments 72 through 86, wherein the aluminum containing layer has a tensile strength of at least 50 MPa, at least 55 MPa, 60 MPa, at least 65 MPa, at least 70 MPa, at least 75 MPa, or at least 80 MPa.

Embodiment 88

The bushing according to any one of embodiments 72 through 87, wherein the aluminum containing layer has a tensile strength of not greater than 200 MPa, not greater than 190 MPa, not greater than 180 MPa, not greater than 160 MPa, not greater than 150 MPa, not greater than 140 MPa, not greater than 130 MPa, not greater than 120 MPa, not greater than 110 MPa, or not greater than 100 MPa.

Embodiment 89

The bushing according to any one of embodiments 72 through 88, wherein the aluminum containing layer has an aluminum content of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 90

The bushing according to any one of embodiments 72 through 89, wherein the combined tensile strength of the load bearing substrate and the aluminum containing is at least 70% of the tensile strength of the load bearing substrate, at least 75% of the tensile strength of the load bearing substrate, at least 80% of the tensile strength of the load bearing substrate, at least 80% of the tensile strength of the load bearing substrate, or at least 85% of the tensile strength of the load bearing substrate.

Embodiment 91

The bushing according to any one of embodiments 72 through 90, wherein the aluminum containing layer has content of magnesium of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 92

The bushing according to any one of embodiments 72 through 91, wherein the aluminum containing layer has an aluminum content of not greater than 99.99999 wt %, not greater than 99.99 wt %, not greater than 99.95 wt %, not greater than 99.9 wt %, not greater than 99.85 wt %, not greater than 99.8 wt %, not greater than 99.5 wt %, not greater than 99 wt %, not greater than 98 wt %, not greater than 95 wt %, not greater than 93 wt %, or not greater than 85 wt %.

Embodiment 93

The bushing according to any one of embodiments 72 through 77, wherein the aluminum containing layer has an aluminum content in a range from 25 wt % to 99.99999 wt %, in a range from 50 wt % to 99.99 wt %, in a range from 90 wt % to 99.99 wt %, or in a range from 95 wt % to 99.9 wt %.

Embodiment 94

The bushing according to any one of embodiments 72 through 93, wherein the sliding layer comprises a fluoroploymer.

Embodiment 95

The bushing according to any one of embodiments 72 through 94, wherein the sliding layer comprises a polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, or a mixture thereof.

Embodiment 96

The bushing according to any one of embodiments 72 through 95, wherein the sliding layer comprises a polytetrafluoroethylene compound layer.

Embodiment 97

The bushing according to any one of embodiments 72 through 96, wherein the sliding layer consists essentially of a polytetrafluoroethylene compound layer.

Embodiment 98

The bushing according to any one of embodiments 72 through 97, wherein the sliding layer has a thickness in a range between 0.05 mm and 5 mm, in a range between 0.2 mm and 2 mm, or in a range between 0.3 mm and 1 mm.

Embodiment 99

The bushing according to any one of embodiments 72 through 98 further comprising an adhesive layer adjacent to the sliding layer.

Embodiment 100

The bushing according to embodiment 99, wherein the adhesive layer comprises a thermoplastic.

Embodiment 101

The bushing according to embodiment 100, wherein the thermoplastic comprises tetrafluoroethylene-hexafluoropropylene (FEP), perfluoroalkoxyethylene (PFA), polyimide (PI), polyamidimide (PAI), polyphenylene sulfide (PPS), polyphenylene sulfone (PPSO2), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), polyetherketone (PEK), polyethylene (PE), UHMWPE, or any combination thereof.

Embodiment 102

The bushing according to embodiment 101, wherein the adhesive layer consists essentially of a thermoplastic selected from the group of tetrafluoroethylene-hexafluoropropylene (FEP), perfluoroalkoxyethylene (PFA), and a combination thereof.

Embodiment 103

The bushing according to embodiment 102, wherein the thermoplastic includes a modified thermoplastic comprising at least one of the group selected from C(=O)R, C—O—R, COOH, COOR, COH, ore any combination thereof, wherein R are cyclic or linear organic residues having from 1 to 20 carbon atoms.

Embodiment 104

The bushing according to any one of embodiments 72 through 103 further comprising an expanded metal layer adjacent to the first major surface.

Embodiment 105

The bushing according to embodiment 104, wherein the expanded metal layer comprises an aluminum alloy, a steel metal, a steel cladded or coated with an aluminum containing layer, or a combination thereof.

Embodiment 106

The bushing according to embodiment 104, wherein the expanded metal layer is embedded in a polymer matrix.

Embodiment 107

The bushing according to any one of embodiments 72 through 106, wherein the aluminum containing layer has a structured surface.

Embodiment 108

The according to any one of embodiments 72 through 107, wherein the aluminum containing layer has a structured surface comprising wall-like depressions, wall-like elevations, or any combination thereof.

Embodiment 109

The bushing according to embodiment 108, wherein the wall-like depressions or wall-like elevations have a height in a range of 0.1 microns to 200 microns, in a range of 1 micron to 50 microns, or 2 microns to 30 microns.

Embodiment 110

The bushing according to any one of embodiments 72 through 109, wherein the aluminum containing layer has a polygon structure.

Embodiment 111

The bushing according to embodiment 110, wherein the polygon structure is regular or non-regular.

Embodiment 112

The bushing according to embodiment 110, wherein the polygon structure is a honeycomb structure.

Embodiment 113

The bushing according to any one of embodiments 72 through 112 further comprising an aluminous layer overlying the edges.

Embodiment 114

The bushing according to any one of embodiments 72 through 113, wherein the aluminous layer comprises $Al_2O_3$.

Embodiment 115

The bushing according to embodiment 114, wherein the aluminous layer has a thickness of not greater than 5 microns, not greater than 4 microns, not greater than 3 microns, not greater than 2 microns, not greater than 1.5 microns, not greater than 1 micron, not greater than 0.9 microns, not greater than 0.8 microns, not greater than 0.7 microns, not greater than 0.6 microns, or not greater than 0.5 microns.

Embodiment 116

The bushing according to any one of embodiments 72 through 115, wherein the bushing has a corrosion resistance rating according to neutral salt spray test ISO 9227:2006, of at least 300 hours, at least 400 hours, at least 500 hours, at least 600 hours, at least 700 hours, at least 800 hours, at least 900 hours, at least 1000 hours, or at least 1100 hours.

Embodiment 117

The bushing according to any one of embodiments 72 through 116, wherein the bushing has sizing capability of at least 3%, at least 4%, at least 5%, at least 6%, at least 7%, at least 8%, at least 10%, at least 12%, at least 14%, at least 16%, or at least 18%.

Embodiment 118

A bushing comprising:
a load bearing substrate, having a first major surface, a second major surface, and an edge, the load bearing substrate having a thickness between 200 microns and 3000 microns,
a corrosion prevention layer overlying and in direct contact with the first major surface, the corrosion prevention layer having a thickness between 20 microns and 300 microns, and
a sliding layer overlying the first or the second major surface.

Embodiment 119

The bushing according to embodiment 118 further comprising an additional corrosion prevention layer overlying and in direct contact with the second major surface, the additional corrosion prevention layer having a thickness between 20 microns and 300 microns.

Embodiment 120

The bushing according to any one of embodiments 118 or 119 further comprising a functional layer overlying the load bearing substrate opposite the sliding layer.

Embodiment 121

The bushing according to embodiment 120, wherein the functional layer is a second sliding layer.

Embodiment 122

The bushing according to embodiment 120, wherein the functional layer is an elastomeric layer.

Embodiment 123

The bushing according to embodiment 122, wherein the elastomeric layer includes at least one of nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

Embodiment 124

The bushing according to any one of embodiments 118 through 123, wherein the thickness of the corrosion prevention layer is in a range from 20 microns to 250 microns, in a range from 25 microns to 200 microns, in a range from 30 microns to 150 microns, or in a range from 40 microns to 100 microns.

Embodiment 125

The bushing according to any one of embodiments 118 through 124, wherein the thickness of the load bearing substrate is in a range from 200 microns to 2500 microns, in a range from 250 microns to 2000 microns, in a range from 300 microns to 1500 microns, or in a range from 350 microns to 1000 microns.

Embodiment 126

The bushing according to any one of embodiments 118 through 125, wherein the load bearing substrate contains a metal selected from an iron, tin, copper, zinc, titanium, scandium, vanadium, chromium, manganese, cobalt, nickel, or any combination thereof.

Embodiment 127

The bushing according to embodiment 126, wherein the iron-containing substrate comprises steel.

Embodiment 128

The bushing according to any one of embodiments 118 through 127, wherein the load bearing substrate is selected from a steel substrate, a brass substrate, a bronze substrate, or a combination thereof.

Embodiment 129

The bushing according to any one of embodiments 118 through 128, wherein the load bearing substrate consists essentially of a steel substrate.

Embodiment 130

The bushing according to any one of embodiments 118 through 129, wherein the corrosion prevention layer contains a metal selected from magnesium, aluminum, titanium, scandium, zinc, or any combination thereof.

Embodiment 131

The bushing according to embodiment 130, wherein the corrosion prevention layer consists essentially of magnesium, aluminum, or a combination thereof.

Embodiment 132

The bushing according to any one of embodiments 118 through 131, wherein the corrosion prevention layer contains a metal having an electronegativity of not greater than 1.70, not greater than 1.69, not greater than 1.68, not greater than 1.67, not greater than 1.66, not greater than 1.65, not greater than 1.63, not greater than 1.60, not greater than 1.55, not greater than 1.50, or not greater than 1.45.

Embodiment 133

The bushing according to any one of embodiments 118 through 132, wherein the load bearing substrate has a tensile strength of at least 120 MPa, at least 140 MPa, 160 MPa, at least 180 MPa, at least 200 MPa, at least 220 MPa, or at least 240 MPa.

Embodiment 134

The bushing according to any one of embodiments 118 through 133, wherein the load bearing substrate has a tensile strength of not greater than 600 MPa, not greater than 500 MPa, not greater than 450 MPa, not greater than 400 MPa, not greater than 350 MPa, not greater than 300 MPa, or not greater than 250 MPa.

Embodiment 135

The bushing according to any one of embodiments 118 through 134, wherein the load bearing substrate has a yield strength in a range from 100 MPa to 2000 MPa, in a range from 150 MPa to 1500 MPa, in a range from 200 MPa to 1000 MPa, or in a range from 200 MPa to 600 MPa.

Embodiment 136

The bushing according to any one of embodiments 118 through 135, wherein the corrosion prevention layer has a tensile strength of at least 50 MPa, at least 55 MPa, 60 MPa, at least 65 MPa, at least 70 MPa, at least 75 MPa, or at least 80 MPa.

Embodiment 137

The bushing according to any one of embodiments 118 through 136, wherein the corrosion prevention layer has a tensile strength of not greater than 200 MPa, not greater than 190 MPa, not greater than 180 MPa, not greater than 160 MPa, not greater than 150 MPa, not greater than 140 MPa, not greater than 130 MPa, not greater than 120 MPa, not greater than 110 MPa, or not greater than 100 MPa.

Embodiment 138

The bushing according to any one of embodiments 118 through 137, wherein the combined tensile strength of the load bearing substrate and the corrosion prevention is at least 70% of the tensile strength of the load bearing substrate, at least 75% of the tensile strength of the load bearing substrate, at least 80% of the tensile strength of the load bearing substrate, at least 80% of the tensile strength of the load bearing substrate, or at least 85% of the tensile strength of the load bearing substrate.

Embodiment 139

The bushing according to any one of embodiments 118 through 138, wherein the corrosion prevention layer has content of magnesium of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 140

The bushing according to any one of embodiments 118 through 139, wherein the corrosion prevention layer has a magnesium content of not greater than 99.99999 wt %, not greater than 99.99 wt %, not greater than 99.95 wt %, not greater than 99.9 wt %, not greater than 99.85 wt %, not greater than 99.8 wt %, not greater than 99.5 wt %, not greater than 99 wt %, not greater than 98 wt %, not greater than 95 wt %, not greater than 93 wt %, or not greater than 85 wt %.

Embodiment 141

The bushing according to any one of embodiments 118 through 139, wherein the corrosion prevention layer has a magnesium content in a range from 25 wt % to 99.99999 wt %, in a range from 50 wt % to 99.99 wt %, in a range from 90 wt % to 99.99 wt %, or in a range from 95 wt % to 99.9 wt %.

Embodiment 142

The bushing according to any one of embodiments 118 through 141, wherein the sliding layer comprises a fluoroploymer.

Embodiment 143

The bushing according to any one of embodiments 118 through 142, wherein the sliding layer comprises a polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, or a mixture thereof.

Embodiment 144

The bushing according to any one of embodiments 118 through 143, wherein the sliding layer comprises a polytetrafluoroethylene compound layer.

Embodiment 145

The bushing according to any one of embodiments 118 through 144, wherein the sliding layer consists essentially of a polytetrafluoroethylene compound layer.

Embodiment 146

The bushing according to any one of embodiments 118 through 145, wherein the sliding layer has a thickness in a range between 0.05 mm and 5 mm, in a range between 0.2 mm and 2 mm, or in a range between 0.3 mm and 1 mm.

Embodiment 147

The bushing according to any one of embodiments 118 through 146 further comprising an adhesive layer adjacent to the sliding layer.

Embodiment 148

The bushing according to embodiment 147, wherein the adhesive layer comprises a thermoplastic.

Embodiment 149

The bushing according to embodiment 148, wherein the thermoplastic comprises tetrafluoroethylene-hexafluoropropylene (FEP), perfluoroalkoxyethylene (PFA), polyimide (PI), polyamidimide (PAI), polyphenylene sulfide (PPS), polyphenylene sulfone (PPSO2), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), polyetherketone (PEK), polyethylene (PE), UHMWPE, or any combination thereof.

Embodiment 150

The bushing according to embodiment 149, wherein the adhesive layer consists essentially of a thermoplastic selected from the group of tetrafluoroethylene-hexafluoropropylene (FEP), perfluoroalkoxyethylene (PFA), and a combination thereof.

Embodiment 151

The bushing according to embodiment 150, wherein the thermoplastic includes a modified thermoplastic comprising at least one of the group selected from C(=O)R, C—O—R, COOH, COOR, COH, ore any combination thereof, wherein R are cyclic or linear organic residues having from 1 to 20 carbon atoms.

Embodiment 152

The bushing according to any one of embodiments 118 through 151 further comprising an expanded metal layer adjacent to the first major surface.

Embodiment 153

The bushing according to embodiment 152, wherein the expanded metal layer comprises an aluminum alloy, a steel metal, a steel cladded or coated with an corrosion prevention layer, or a combination thereof.

Embodiment 154

The bushing according to embodiment 152, wherein the expanded metal layer is embedded in a polymer matrix.

Embodiment 155

The bushing according to any one of embodiments 118 through 154, wherein the corrosion prevention layer has a structured surface.

Embodiment 156

The according to any one of embodiments 118 through 155, wherein the corrosion prevention layer has a structured surface comprising wall-like depressions, wall-like elevations, or any combination thereof.

Embodiment 157

The bushing according to embodiment 156, wherein the wall-like depressions or wall-like elevations have a height in a range of 0.1 microns to 200 microns, in a range of 1 micron to 50 microns, or 2 microns to 30 microns.

Embodiment 158

The bushing according to any one of embodiments 118 through 157, wherein the corrosion prevention layer has a polygon structure.

Embodiment 159

The bushing according to embodiment 158, wherein the polygon structure is regular or non-regular.

Embodiment 160

The bushing according to embodiment 158, wherein the polygon structure is a honeycomb structure.

Embodiment 161

The bushing according to any one of embodiments 118 through 160 further comprising an aluminous layer overlying the edges.

Embodiment 162

The bushing according to any one of embodiments 118 through 161, wherein the aluminous layer comprises $Al_2O_3$.

Embodiment 163

The bushing according to embodiment 161, wherein the aluminous layer has a thickness of not greater than 5 microns, not greater than 4 microns, not greater than 3 microns, not greater than 2 microns, not greater than 1.5 microns, not greater than 1 micron, not greater than 0.9 microns, not greater than 0.8 microns, not greater than 0.7 microns, not greater than 0.6 microns, or not greater than 0.5 microns.

Embodiment 164

The bushing according to any one of embodiments 118 through 163, wherein the bushing has a corrosion resistance rating according to neutral salt spray test ISO 9227:2006, of at least 300 hours, at least 400 hours, at least 500 hours, at least 600 hours, at least 700 hours, at least 800 hours, at least 900 hours, at least 1000 hours, or at least 1100 hours.

Embodiment 165

The bushing according to any one of embodiments 118 through 164, wherein the bushing has sizing capability of at least 3%, at least 4%, at least 5%, at least 6%, at least 7%, at least 8%, at least 10%, at least 12%, at least 14%, at least 16%, or at least 18%.

Embodiment 166

A sliding article comprising:
a load bearing substrate, having a first major surface, a second major surface, and an edge, the load bearing having a thickness t1,
a coating overlying and in direct contact with the first major surface, the coating comprising elemental metal having a Pauling electronegativity less than 1.83, the coating having a thickness t2, wherein t2 is at least 10 microns,
a sliding layer overlying the first or the second major surface,
wherein a ratio of t2/t1 is at least 1/10.

Embodiment 167

A hinge assembly comprising:
a first hinge portion and a second hinge portion;
a pin joining the first hinge portion with the second hinge portion; and
a sliding article, the sliding article comprising:
a load bearing substrate, having a first major surface, a second major surface, and an edge, the load bearing having a thickness t1,
a coating overlying and in direct contact with the first major surface, the coating comprising elemental metal having a Pauling electronegativity less than 1.83, the coating having a thickness t2, wherein t2 is at least 10 microns,
a sliding layer overlying the first or the second major surface,
wherein a ratio of t2/t1 is at least 1/10.

Embodiment 168

The sliding article or hinge assembly according to any one of embodiments 166 or 167 further comprising an additional coating overlying and in direct contact with the second major surface, the additional coating having a thickness t3.

Embodiment 169

The sliding article or hinge assembly according to any one of embodiments 166 through 168 further comprising a functional layer overlying the load bearing substrate opposite the sliding layer.

Embodiment 170

The sliding article or hinge assembly according to embodiment 169, wherein the functional layer is a second sliding layer.

Embodiment 171

The sliding article or hinge assembly according to embodiment 169, wherein the functional layer is an elastomeric layer.

Embodiment 172

The sliding article or hinge assembly according to embodiment 171, wherein the elastomeric layer includes at least one of nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer.

Embodiment 173

The sliding article or hinge assembly according to embodiment 166, wherein a ratio of (t2+t3)/t1 is not greater than 1/3, not greater than 2/7, not greater than 1/4, not greater than 2/9, or not greater than 1/5.

Embodiment 174

The sliding article or hinge assembly according to embodiment 166, wherein a ratio of (t2+t3)/t1 is in a range from 1/10 to 1/3, in a range from 1/8 to 1/3, or in a range from 1/5 to 1/3.

Embodiment 175

The sliding article or hinge assembly according to any one of embodiments 166 to 174, wherein the ratio of t2/t1 is not

Embodiment 176

The sliding article or hinge assembly according to any one of embodiments 166 to 175, wherein the ratio of t2/t1 is in a range from 1/10 to 1/3, in a range from 1/10 to 1/5, or in a range from 1/9 to 1/7.

Embodiment 177

The sliding article or hinge assembly according to any one of embodiments 166 to 176, wherein t2 is at least 25 microns, at least 30 microns, at least 35 microns, at least 40 microns, at least 45 microns, or at least 50 microns.

Embodiment 178

The sliding article or hinge assembly according to any one of embodiments 166 to 177, wherein t2 is not greater than 200 microns, not greater than 180 microns, not greater than 160 microns, not greater than 140 microns, not greater than 120 microns, not greater than 100 microns, not greater than 90 microns, not greater than 80 microns, not greater than 70 microns, or not greater than 60 microns.

Embodiment 179

The sliding article or hinge assembly according to any one of embodiments 166 to 178, wherein t2 is in a range from 20 microns to 200 microns, in a range from 25 microns to 180 microns, in a range from 30 microns to 120 microns, or in a range from 40 microns to 80 microns.

Embodiment 180

The sliding article or hinge assembly according to any one of embodiments 166 to 179, wherein t1 is at least 50 microns, at least 80 microns, at least 100 microns, at least 150 microns, at least 200 microns, at least 300 microns, at least 400 microns, at least 500 microns, at least 600 microns, at least 800 microns, at least 1000 microns, at least 1200 microns, at least 1400 microns, at least 1600 microns, at least 1800 microns, or at least 2000 microns.

Embodiment 181

The sliding article or hinge assembly according to any one of embodiments 166 to 180, wherein t1 is not greater than 2200 microns, not greater than 2000 microns, not greater than 1800 microns, not greater than 1600 microns, not greater than 1400 microns, not greater than 1200 microns, not grater than 1000 microns, not greater than 800 microns, not greater than 700 microns, not greater than 650 microns, not greater than 600 microns, not greater than 550 microns, not greater than 500 microns, not greater than 480 microns, not greater than 460 microns, not greater than 440 microns, or not greater than 420 microns.

Embodiment 182

The sliding article or hinge assembly according to any one of embodiments 166 to 181, wherein t1 is in a range from 50 microns to 2000 microns, in a range from 100 microns to 1000 microns, in a range from 200 microns to 500 microns, or in a range from 300 microns to 450 microns.

Embodiment 183

The sliding article or hinge assembly according to any one of embodiments 166 to 182, wherein the load bearing substrate contains a metal selected from an iron, tin, copper, zinc, titanium, scandium, vanadium, chromium, manganese, cobalt, nickel, or any combination thereof.

Embodiment 184

The sliding article or hinge assembly according to embodiment 183, wherein the iron-containing substrate comprises steel.

Embodiment 185

The sliding article or hinge assembly according to any one of embodiments 166 to 184, wherein the load bearing substrate is selected from a steel substrate, a brass substrate, a bronze substrate, or a combination thereof.

Embodiment 186

The sliding article or hinge assembly according to any one of embodiments 166 to 185, wherein the load bearing substrate comprises a steel substrate.

Embodiment 187

The sliding article or hinge assembly according to any one of embodiments 166 to 186, wherein the load bearing substrate consists essentially of a steel substrate.

Embodiment 188

The sliding article or hinge assembly according to any one of embodiments 166 to 187, wherein the load bearing substrate has a tensile strength of at least 120 MPa, at least 140 MPa, 160 MPa, at least 180 MPa, at least 200 MPa, at least 220 MPa, or at least 240 MPa.

Embodiment 189

The sliding article or hinge assembly according to any one of embodiments 166 to 188, wherein the load bearing substrate has a tensile strength of not greater than 600 MPa, not greater than 500 MPa, not greater than 450 MPa, not greater than 400 MPa, not greater than 350 MPa, not greater than 300 MPa, or not greater than 250 MPa.

Embodiment 190

The sliding article or hinge assembly according to any one of embodiments 166 to 189, wherein the load bearing substrate has a yield strength in a range from 100 MPa to 2000 MPa, in a range from 150 MPa to 1500 MPa, in a range from 200 MPa to 1000 MPa, or in a range from 200 MPa to 600 MPa.

Embodiment 191

The sliding article or hinge assembly according to any one of embodiments 166 to 190, wherein the coating has a tensile strength of at least 50 MPa, at least 55 MPa, 60 MPa, at least 65 MPa, at least 70 MPa, at least 75 MPa, or at least 80 MPa.

Embodiment 192

The sliding article or hinge assembly according to any one of embodiments 166 to 191, wherein the coating has a tensile strength of not greater than 200 MPa, not greater than 190 MPa, not greater than 180 MPa, not greater than 160 MPa, not greater than 150 MPa, not greater than 140 MPa, not greater than 130 MPa, not greater than 120 MPa, not greater than 110 MPa, or not greater than 100 MPa.

Embodiment 193

The sliding article or hinge assembly according to any one of embodiments 166 to 192, wherein the coating comprises elemental metal selected from the group of beryllium, magnesium, aluminum, zinc, or any combination thereof Embodiment 194

The sliding article or hinge assembly according to any one of embodiments 166 to 193, wherein the combined tensile strength of the load bearing substrate and the coating is at least 70% of the tensile strength of the load bearing substrate, at least 75% of the tensile strength of the load bearing substrate, at least 80% of the tensile strength of the load bearing substrate, at least 80% of the tensile strength of the load bearing substrate, or at least 85% of the tensile strength of the load bearing substrate.

Embodiment 195

The sliding article or hinge assembly according to any one of embodiments 166 to 194, wherein the coating has content of the elemental metal selected from magnesium, aluminum, or zinc of at least 20 wt %, at least 30 wt %, at least 40 wt %, at least 50 wt %, at least 60 wt %, at least 70 wt %, at least 75 wt %, at least 80 wt %, at least 85 wt %, or at least 90 wt %.

Embodiment 196

The sliding article or hinge assembly according to any one of embodiments 166 to 195, wherein the coating has the elemental metal selected from magnesium, aluminum, or zinc in a range from 25 wt % to 99.99999 wt %, in a range from 50 wt % to 99.99 wt %, in a range from 90 wt % to 99.99 wt %, or in a range from 95 wt % to 99.9 wt %.

Embodiment 197

The sliding article or hinge assembly according to any one of embodiments 166 to 196, wherein the sliding layer comprises a fluoroploymer.

Embodiment 198

The sliding article or hinge assembly according to any one of embodiments 166 to 197, wherein the sliding layer comprises a polytetrafluoroethylene (PTFE), a modified PTFE (TFM), a fluorinated ethylene propylene (FEP), a polyvinylidene fluoride (PVDF), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), a perfluoro methyl alkoxy (MFA), polyoxymethylene (POM), polyethylene (PE), UHMWPE, or a mixture thereof.

Embodiment 199

The sliding article or hinge assembly according to any one of embodiments 166 to 198, wherein the sliding layer comprises a polytetrafluoroethylene compound layer.

Embodiment 200

The sliding article or hinge assembly according to any one of embodiments 166 to 199, wherein the sliding layer consists essentially of a polytetrafluoroethylene compound layer.

Embodiment 201

The sliding article or hinge assembly according to any one of embodiments 166 to 200, wherein the sliding layer has a thickness of at least about 0.01 mm, at least about 0.05 mm, at least about 0.1 mm, at least about 0.15 mm, at least about 0.2 mm, at least about 0.25 mm, at least about 0.3 mm, at least about 0.35 mm, at least about 0.4 mm, or at least about 0.45 mm.

Embodiment 202

The sliding article or hinge assembly according to any one of embodiments 166 to 201, wherein the sliding layer has a thickness of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm.

Embodiment 203

The sliding article or hinge assembly according to any one of embodiments 166 to 202, wherein the sliding layer has a thickness in a range between 0.05 mm and 5 mm, in a range between 0.2 mm and 2 mm, or in a range between 0.3 mm and 1 mm.

Embodiment 204

The sliding article or hinge assembly according to any one of embodiments 166 to 203 further comprising an adhesive layer adjacent to the sliding layer.

Embodiment 205

The sliding article or hinge assembly according to embodiment 204, wherein the adhesive layer comprises a thermoplastic.

Embodiment 206

The sliding article or hinge assembly according to embodiment 205, wherein the thermoplastic comprises tetrafluoroethylene-hexafluoropropylene (FEP), perfluoroalkoxyethylene (PFA), polyimide (PI), polyamidimide (PAI), polyphenylene sulfide (PPS), polyphenylene sulfone (PPSO2), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), polyetherketone (PEK), polyethylene (PE), UHMWPE, or any combination thereof.

Embodiment 207

The sliding article or hinge assembly according to embodiment 205, wherein the adhesive layer consists essentially of a thermoplastic selected from the group of tetrafluoroethylene-hexafluoropropylene (FEP), perfluoroalkoxyethylene (PFA), and a combination thereof.

Embodiment 208

The sliding article or hinge assembly according to embodiment 205, wherein the thermoplastic includes a modified thermoplastic comprising at least one of the group selected from C(=O)R, C—O—R, COOH, COOR, COH, ore any combination thereof, wherein R are cyclic or linear organic residues having from 1 to 20 carbon atoms.

Embodiment 209

The sliding article or hinge assembly according to any one of embodiments 166 to 208 further comprising a discontinuous metal layer adjacent to the first major surface.

Embodiment 210

The sliding article or hinge assembly according to embodiment 209, wherein the discontinuous metal layer includes an expanded metal, a mesh, a fleece, a foam, or a combination thereof.

Embodiment 211

The sliding article or hinge assembly according to embodiment 209, wherein the discontinuous metal layer is embedded in a polymer matrix.

Embodiment 212

The sliding article or hinge assembly according to embodiment 209, wherein the discontinuous metal layer has a mesh size of at least 10 mesh/inch, such as at least 11 mesh/inch, at least 13 mesh/inch, at least 15 mesh/inch, at least 17 mesh/inch, at least 19 mesh/inch, or at least 21 mesh/inch.

Embodiment 213

The sliding article or hinge assembly according to embodiment 209, wherein the discontinuous metal layer has a thickness of at least 0.1 mm, such as at least 0.2 mm, at least 0.3 mm, at least 0.4 mm, at least 0.5 mm, or at least 0.6 mm.

Embodiment 214

The sliding article or hinge assembly according to embodiment 209, wherein the discontinuous metal layer has a thickness of not greater than 1 mm, not greater than 0.9 mm, not greater than 0.8 mm, not greater than 0.7 mm, not greater than 0.6 mm, not greater than 0.55 mm, or not greater than 0.5 mm.

Embodiment 215

The sliding article or hinge assembly according to any one of embodiments 166 to 214, wherein the coating has a structured surface.

Embodiment 216

The sliding article or hinge assembly according to any one of embodiments 166 to 215, wherein the coating has a structured surface comprising wall-like depressions, wall-like elevations, or any combination thereof.

Embodiment 217

The sliding article or hinge assembly according to embodiment 216, wherein the wall-like depressions or wall-like elevations have a height in a range of 0.1 microns to 200 microns, in a range of 1 micron to 50 microns, or 2 microns to 30 microns.

Embodiment 218

The sliding article or hinge assembly according to any one of embodiments 166 to 217, wherein the coating has a polygon structure.

Embodiment 219

The sliding article or hinge assembly according to embodiment 218, wherein the polygon structure is regular or non-regular.

Embodiment 220

The sliding article or hinge assembly according to embodiment 218, wherein the polygon structure is a honeycomb structure.

Embodiment 221

The sliding article or hinge assembly according to any one of embodiments 166 to 220, wherein the coating has a surface roughness of at least 1 micron, at least 2 microns, at least 3 microns, at least 4 microns, or at least 5 microns.

Embodiment 222

The sliding article or hinge assembly according to any one of embodiments 166 to 222, wherein the coating has a surface roughness of not greater than 20 microns, not greater than 15 microns, not greater than 12 microns, not greater than 10 microns, or not greater than 8 microns.

Embodiment 223

The sliding article or hinge assembly according to any one of embodiments 166 to 222 further comprising an passivating layer overlying the edges.

Embodiment 224

The sliding article or hinge assembly according to embodiment 223, wherein the passivating layer comprises a compound selected from $Al_2O_3$, MgO, ZnO, BeO, or any combination thereof.

Embodiment 225

The sliding article or hinge assembly according to embodiment 223, wherein the passivating layer has a thickness of not greater than 5 microns, not greater than 4 microns, not greater than 3 microns, not greater than 2 microns, not greater than 1.5 microns, not greater than 1 micron, not greater than 0.9 microns, not greater than 0.8 microns, not greater than 0.7 microns, not greater than 0.6 microns, or not greater than 0.5 microns.

Embodiment 226

The sliding article or hinge assembly according to any one of embodiments 166 to 225, wherein the sliding article has a corrosion resistance rating according to neutral salt spray test ISO 9227:2006, of at least 300 hours, at least 400 hours, at least 500 hours, at least 600 hours, at least 700 hours, at least 800 hours, at least 900 hours, at least 1000 hours, or at least 1100 hours.

Embodiment 227

The sliding article or hinge assembly according to any one of embodiments 166 to 226, wherein the sliding article has a corrosion resistance rating of not greater than 1 million hours, not greater than 100 000 hours, or not greater than 10000 hours.

Embodiment 228

The sliding article or hinge assembly according to any one of embodiments 166 to 227, wherein the sliding article has sizing capability of at least 3%, at least 4%, at least 5%, at least 6%, at least 7%, at least 8%, at least 10%, at least 12%, at least 14%, at least 16%, or at least 18%.

Embodiment 229

The sliding article or hinge assembly according to any one of embodiments 1 to 64 or 166 to 228, wherein the sliding article is selected from a plain bearing, a bushing, a spherical bearing, a ball bearing, a washer, a bearing shell, or a combination thereof.

Examples

A Corrosion Resistance Rating is determined according to neutral salt spray test ISO 9227:2006. Samples are stored at room temperature for 24 hours prior testing. Samples are set on PVC racks or hung from a nylon thread and placed in to a salt spray chamber. At least 5 samples per variation of bushings are tested per salt spray test. A visual examination of the samples occurs in certain intervals.

For example, Sample 1 is prepared by cutting a blank from a laminate comprising 0.25 mm PTFE compound tape, 0.03 mm ETFE adhesive, and a substrate comprising 0.47 mm double side aluminum-cladded steel, wherein each aluminum layer is 20 microns. Sample 1 is prepared by cutting a blank from a laminate comprising 0.25 mm PTFE compound tape, 0.03 mm ETFE adhesive, and a substrate comprising 0.45 mm double side aluminum-cladded steel, wherein each aluminum layer is 50 microns. Accordingly, the difference between Sample 1 and Sample 2 is the thickness of the aluminum layers.

The samples are shaped to form the semi-finished bushing. The blank is shaped by rolling and flanging to obtain the desired shape. The Corrosion Resistance Rating of Sample 1 was determined to be less than 300 hours, i.e. red corrosion was observed at 300 hours. The Corrosion Resistance Rating of Sample 2 was determined to be at least 1000 hours, i.e. no observation of red corrosion at 1000 hours, and no red rust observation after 1500 hours and 3000 hours.

Figure 3A:
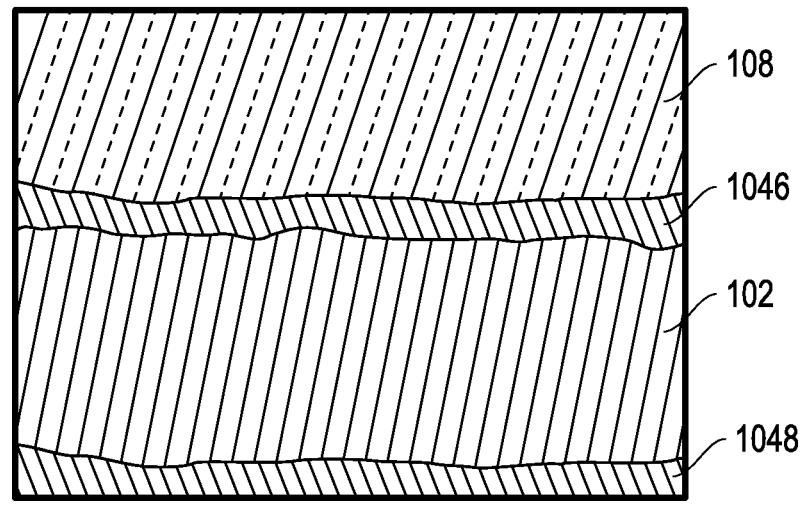
FIGS. 3A and 3B are illustrations of SEM scans.
Figure 3B:
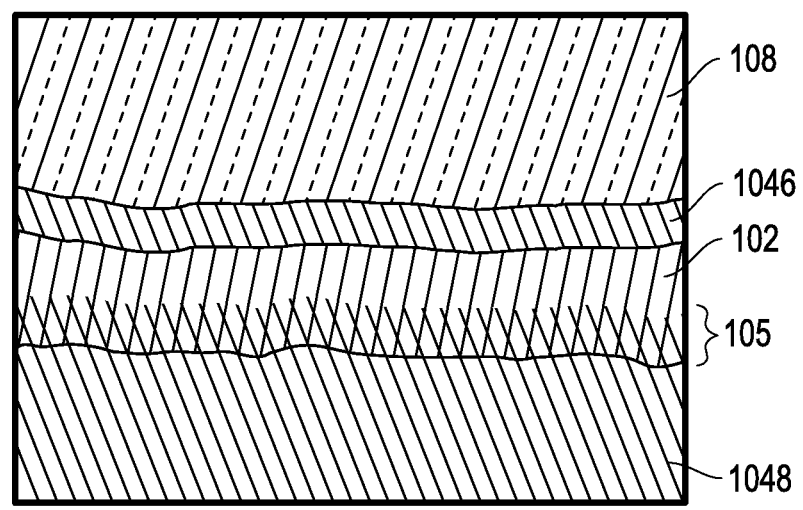

FIGS. 3A and 3B depicts line diagrams of Scanning Electron Microscope scans (SEM) with an energy dispersive X-ray spectroscopy detector (EDS) of Sample 2 of an edge before and after the shaping. In FIG. 3A, layers 1048 and 1046 are the 50 microns aluminum layers cladded onto steel layer 102. Sliding layer 108 is a PTFE tape and the adhesive layer between 108 and 1046 cannot be distinguished by EDS analysis. As can be seen after the shaping the substrate 102 is covered by aluminum from layer 1048 as a result of the shaping process. The coverage does not extend across the entire cross area of layer 102. In fact there is a transitional area 105 that shows the presence of iron and aluminum.

For Sizing capacity testing, three bushings having a wall thickness of 1 mm. Bushing 1 was a standard SM material (SM100CG, available from Saint-Gobain Performance Plastics) with a 0.5 mm double side aluminum-cladded steel, wherein each aluminum layer is 50 microns, Bushing 2 was an SM 100CG bushing further including a 0.4 mm expanded aluminum (99.5) mesh in the sliding layer, and Bushing 3 was an SM 100CG bushing further including an 0.4 mm expanded aluminum magnesium alloy ($AlMg_3$) mesh in the sliding layer.

Sizing capacity was determined by the amount of deformation upon insertion of a series of 5 oversized pins having an oversize over the inner diameter of the bushing ranging from 0.02 mm to 0.22 mm. The inner diameter of the three bushings was 15 mm. Table 1 depicts the resulting size capabilities (plastic deformation)

TABLE 1

|  | Pin | | | | |
| --- | --- | --- | --- | --- | --- |
|  | 1 | 2 | 3 | 4 | 5 |
| Bushing 1 | 9.5% | 11% | 12.5% | 15% | N/A |
| Bushing 2 | 7.5% | 8.5% | 11.5% | 13% | 16% |
| Bushing 3 | 10% | 12.5% | 14.5% | 16% | 18% |

What is claimed is:
1. A sliding article comprising:
 a load bearing substrate, having a first major surface, a second major surface, and an edge, the load bearing substrate having a thickness $t_1$,
 an aluminum containing layer overlying and in direct contact with the first major surface, the aluminum containing layer having a thickness $t_2$, wherein $t_2$ is at least 10 microns,
 a sliding layer overlying the first or the second major surface,
 wherein a ratio of $t_2/t_1$ is at least 1/10, further comprising a functional layer comprising an elastomer layer overlying the load bearing substrate opposite the sliding layer.

2. The sliding article according to claim 1 further comprising an additional aluminum containing layer overlying and in direct contact with the second major surface, the additional aluminum containing layer having a thickness $t_3$.

3. The sliding article according to claim 1, wherein the functional layer further comprises a second sliding layer.

4. The sliding article according to claim 1, wherein the ratio of $t_2/t_1$ is not greater than 1/3.

5. The sliding article according to claim 1, wherein $t_2$ is at least 25 microns.

6. The sliding article according to claim 1, wherein $t_2$ is not greater than 200 microns.

7. The sliding article according to claim 1, wherein $t_1$ is in a range from 50 microns to 2000 microns.

8. The sliding article according to claim 1, wherein the combined tensile strength of the load bearing substrate and the aluminum containing is at least 70% of the tensile strength of the load bearing substrate.

9. The sliding article according to claim 1, wherein the aluminum containing layer has content of magnesium of at least 20 wt %.

10. The sliding article according to claim 1, wherein the aluminum containing layer has an aluminum content in a range from 25 wt % to 99.99999 wt %.

11. The sliding article according to claim 1 further comprising a discontinuous metal layer adjacent to the first major surface.

12. The sliding article according to claim 11, wherein the discontinuous metal layer comprises aluminum, an aluminum alloy, a steel metal, a steel cladded or coated with an aluminum containing layer, or a combination thereof.

13. A bushing comprising:
a multilayered metallic substrate, the multi-layered substrate comprising
a steel layer having a first major surface and a second major surface,
a first aluminum containing layer adjacent to and in direct contact with the first major surface, and
a second aluminum containing layer adjacent to and in direct contact with the second major surface;
an adhesive layer overlying the multilayered metallic substrate;
a fluoropolymer sliding layer overlying and in direct contact with the adhesive layer.

14. The bushing as claimed in claim 13, characterized in that the bushing has at least one axial collar.

15. The bushing as claimed in claim 13, characterized in that the bushing has an essentially cylindrical shape.

16. The bushing as claimed in claim 13, characterized in that the bushing has a conical shape.

17. A sliding article comprising:
a load bearing substrate, having a first major surface, a second major surface, and an edge, the load bearing substrate having a thickness $t_1$,
an aluminum containing layer overlying and in direct contact with the first major surface, the aluminum containing layer having a thickness $t_2$, wherein $t_2$ is at least 10 microns,
a sliding layer overlying the first or the second major surface, and
an adhesive layer disposed between the aluminum containing layer and the sliding layer,
wherein a ratio of $t_2/t_1$ is at least 1/10, further comprising a functional layer comprising an elastomer layer overlying the load bearing substrate opposite the sliding layer.

18. The sliding article according to claim 17 further comprising an additional aluminum containing layer overlying and in direct contact with the second major surface, the additional aluminum containing layer having a thickness $t_3$.

* * * * *